Nov. 20, 1962

W. C. HUTTON 3,064,684

BY-PASS FITTINGS

Filed July 6, 1959

INVENTOR.
WALTER C. HUTTON
BY
Edward D. O'Brien
ATTORNEY

Nov. 20, 1962  W. C. HUTTON  3,064,684
BY-PASS FITTINGS
Filed July 6, 1959  2 Sheets-Sheet 2

INVENTOR.
WALTER C. HUTTON
BY
Edward D. O'Brien
ATTORNEY

United States Patent Office 3,064,684
Patented Nov. 20, 1962

3,064,684
BY-PASS FITTINGS
Walter C. Hutton, 1567 Waldren Ave.,
Los Angeles 41, Calif.
Filed July 6, 1959, Ser. No. 825,338
4 Claims. (Cl. 137—625.4)

This invention pertains to by-pass fittings in which a valve action is employed.

By-pass fittings of the present invention are primarily intended to be used in connecting a gas meter to a pipe serving to supply gas from such a meter to a user of such gas. They are also capable of being used in a wide variety of other diverse applications in which it may be desired to supply a fluid such as gas to a pipe from either a primary source of supply or from a secondary or auxiliary source of supply.

The by-pass fittings of the present invention are designed so as to supply a need for fittings which can be used in conveying gas from a tank of compressed gas or from a service riser around a gas meter which is being replaced for testing or other purposes. It has been common practice to completely cut off the gas supply to a user of this commodity while replacing such a meter for such purposes. This is obviously very disadvantageous and time-consuming. In addition to the inconvenience caused to the user of gas during such meter replacement, this procedure causes a great deal of difficulty for utility firms since it necessitates employing an individual to test and re-light various appliances normally supplied with gas after a meter has been connected in the proper location.

A broad object of the present invention is to provide by-pass fittings which can be used in supplying gas directly to a user of this commodity during such times as a gas meter or other equipment in the line serving to supply gas to such a user is being repaired or replaced. A more specific object of the present invention is to provide fittings of this category which can be permanently installed in a line or pipe used to supply fluid so as to be available for use at such times as it is desired to supply such fluid to a user from a secondary or auxiliary source of supply. Further objects of this invention are to provide by-pass fittings of the type indicated in this specification which are easily constructed at a comparatively nominal cost and which may be installed and used with only an extremely nominal amount of difficulty.

These and other objects and advantages of this invention will be fully apparent to those skilled in the art to which this invention pertains from a detailed consideration of the remainder of this description, including the appended claims and the accompanying drawings in which:

The accompanying drawings are primarily intended so as to clearly illustrate several presently preferred embodiments or forms of this invention. The basic features employed in the by-pass fittings of this invention shown in the accompanying drawings can be embodied within a number of differently appearing structures which may be easily and conveniently designed through the use of routine engineering skill so as to be based upon the teachings of this invention as set forth in this specification.

As an aid to understanding this invention it can be stated in essentially summary form that it concerns by-pass fittings, each of which includes a housing having inlets and an outlet located between these inlets. Within the fittings of this invention valve seats are provided in the interior of this housing adjacent to these inlets and a valve body is located within this housing in such a manner that it may be moved back and forth between these valve seats so as to permit fluid to flow from either one of the inlets through the outlet while the other inlet is closed or sealed off. The fittings are primarily designed to be used in combination with a connector including means for moving such a valve body from against one of the valve seats to against the other of the valve seats and means for introducing fluid under pressure into the interior of such a housing.

Figure 1:
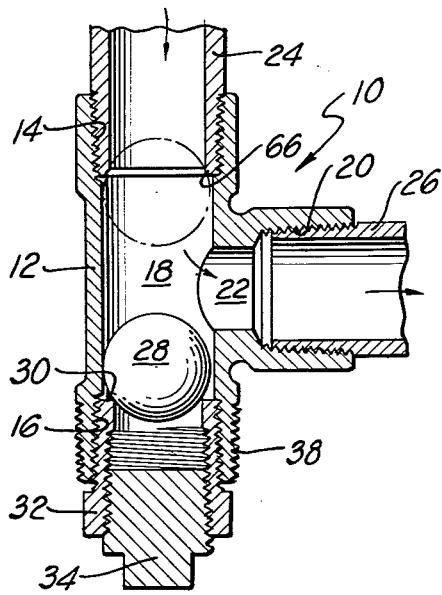
FIG. 1 is a side cross-sectional view illustrating a by-pass fitting of the present invention.

The actual nature of by-pass fittings of this invention is best more fully explained by referring directly to the accompanying drawings. In FIG. 1 of the drawing there is shown a by-pass fitting 10 of the present invention including a generally T-shaped housing 12 having first and second internally threaded inlets, 14 and 16, respectively, both leading into an elongated generally cylindrical passage 18 connecting these inlets. A threaded outlet 20 leads from this passage 18 midway between the inlets 14 and 16. This outlet 20 is provided with a restricted opening 22 adjacent to the passage 18.

In use a pipe 24 is normally threaded into the inlet 14 of the fitting 10 so as to connect this inlet to a gas meter or any other desired fixture in such a manner that the entire fitting 10 is located in a vertical position with the inlet 14 directly above the inlet 16. In use a pipe 26 designed to supply fluid to a user or the like is connected to the outlet 20. When the fitting 10 is held in a vertical position as indicated in FIG. 1 of the drawings a ball 28 serving as a valve body rests against an end 30 serving as a valve seat of an externally and internally threaded sleeve 32 threaded within the inlet 16. In this position the ball 28 by virtue of its weight seals off the inlet 16. In order to prevent undesired movement of the ball 28 from external sources a small plug 34 may be threaded within the sleeve 32.

When it is desired to supply fluid to the pipe 26 from a secondary or auxiliary source of supply this plug 34 may be removed from the sleeve 32. At this point an internally threaded sleeve or bushing 36 may be threaded upon external threads 38 formed around the inlet 16. A threaded end 40 of a member 42 constituting the principal part of a connector may be threaded in the bushing 36 so as to secure this member 42 to the housing 12. This member 42 preferably includes an interior chamber 44 which, in this position, is in communication with the interior of the sleeve 32 immediately below the ball 28. A pipe 46 extends through an opening 48 within the member 42 so as to terminate in an end 50 located adjacent to the ball 28 when the member 42 is in the position shown in FIG. 2 of the drawings. Openings 52 in the pipe 46 adjacent to the end 50 place the interior of the pipe 46 in communication with the interior of the chamber 44.

Figure 2:
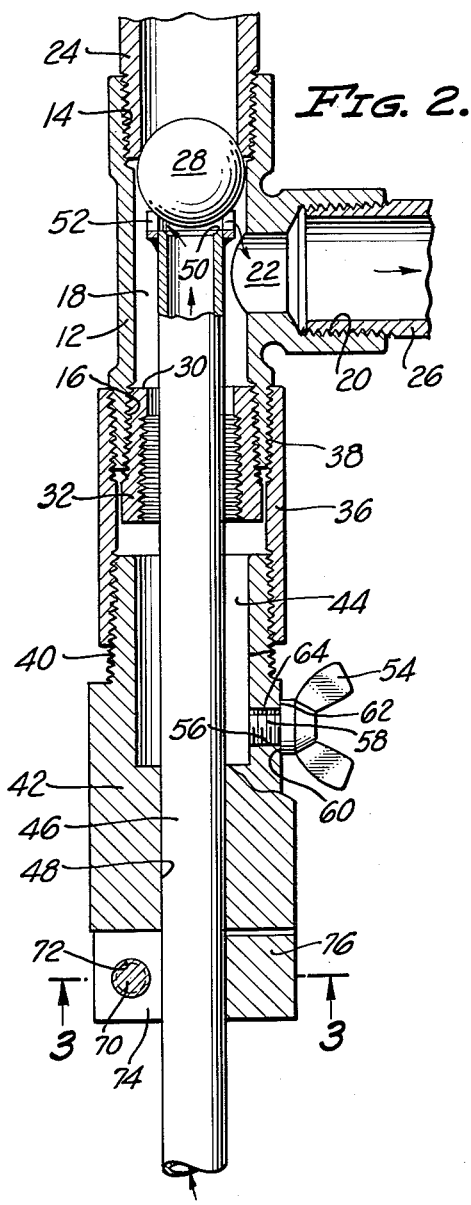
FIG. 2 is a similar view showing this fitting in use with a connector supplying a fluid from a secondary or auxiliary source of supply.
Figure 3:
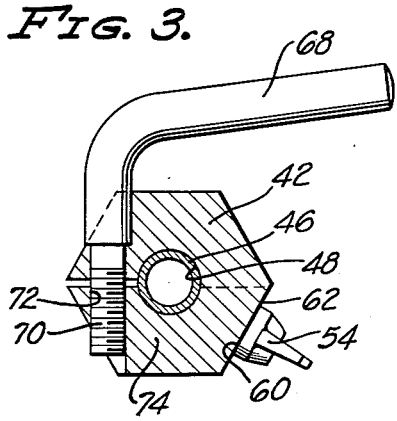
FIG. 3 is a cross-sectional view taken at line 3—3 of FIG. 2.

When the member 42 has been assembled in place in the position shown in FIG. 2 fluid from an auxiliary source of supply such as a tank of compressed gas, a service riser, a regulator, or the like may be conveyed through the pipe 46. Any contaminating air or the like in the pipe 46 or generally within the chamber 44 and the sleeve 32 may be purged from the system by turning a small wing nut 54 constituting a part of a bleed valve mounted upon the member 42. This bleed valve structure includes a threaded opening 56 leading to the chamber 44, a threaded shaft 58 attached to the nut 54 located within the opening 56, and a flat surface 60 located at the base of the nut 54 which is adapted to fit against a flat surface 62 on the member 42 so as to form a seal therewith. A flat side 64 is provided on the shaft 58 so as to permit the escape of gas when the surfaces 60 and 62 are spaced from one another. After unwanted fluids have been purged through this bleed valve structure it may, of course, be closed by tightening the wing nut 54.

At this point, the pipe 46 may be pushed toward the ball 28 so as to move this ball to against an end 66 of the pipe 24 serving as a valve seat. This action closes off the inlet 14 and allows fluid from within the pipe 46 to be conveyed through the openings 52 to the outlet 20 and the pipe 26. The ball 28 may be rigidly held against the end 66 by clamping the pipe 46 in the position shown by tightening a handle 68 extending from a threaded shaft 70 fitting within a threaded opening 72 in a portion 74 of the member 42 so that a resilient arm 76 attached to this portion 74 so as to extend around the pipe 46 is drawn up against the pipe 46.

Figure 4:
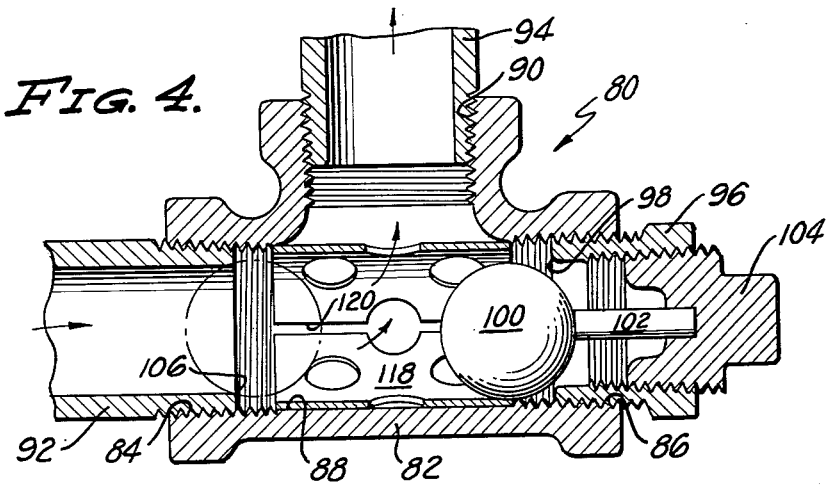
FIG. 4 is a cross-sectional view similar to FIG. 1 of a modified by-pass fitting of this invention.
Figure 5:
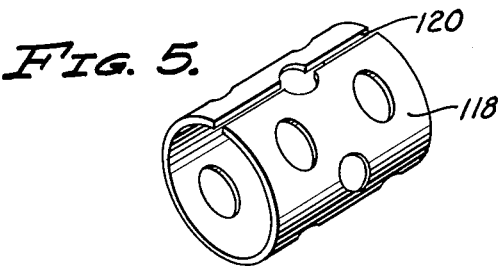
FIG. 5 is a perspective view of a perforated member or sleeve employed in the fitting shown in FIG. 4.

In FIG. 4 of the drawings there is shown a modified fitting 80 of the present invention including a housing 82 having first and second threaded inlets, 84 and 86, respectively, separated by means of an elongated straight passage 88. An outlet 90 leads from the passage 88 between the inlets 84 and 86. With this construction a pipe 92 corresponding to the pipe 24 previously described is threaded within the inlet 84 and a corresponding pipe 94 is threaded within the outlet 90. An internally and externally threaded sleeve 96 corresponding to sleeve 32 previously described is threaded within the inlet 86.

An end 98 of the sleeve 96 serves as a valve seat in the fitting 80 for a ball 100 serving as a valve body. This ball 100 is preferably formed out of a soft magnetic material such as common grades of iron, steel or the like so that it may be held adjacent to the inlet 86 by means of a permanent magnet 102 mounted upon a non-magnetic plug 104 threaded within the sleeve 96. This ball 100 is adapted to be moved from against the valve seat 98 to against an end 106 of the pipe 92 serving as a valve seat through the use of a connector construction as indicated in FIG. 6 of the drawings.

This connector construction includes a member 108 having an end 111 formed with external threads so as to be capable of being screwed within the sleeve 96. When this member 108 has been secured in this manner a pipe 110 extending through an opening 112 in it may be moved toward the ball 100 so that a permanent magnet 114 mounted on an end 116 of the pipe 110 engages the ball 100 so as to hold this ball as it is moved across the passage 88 to against the valve seat 106. During such movement, or movement in the reverse direction, the ball 100 may be secured against movement out of the passage 88 into the outlet 90 through the use of a perforated guide sleeve 118. As indicated in FIG. 4 of the drawing this guide sleeve 118 is of a cylindrical form and includes a slot 120 extending along its length so that it may be temporarily deformed to a reduced diameter as it is being inserted into the passage 88 in the housing 82. When so inserted it automatically springs back to its initial shape, engaging the interior of the housing 82.

Figure 6:
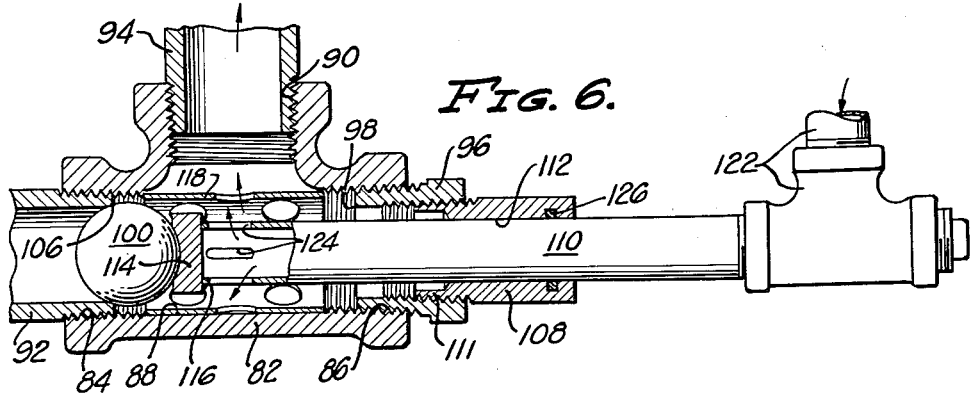
FIG. 6 is a view similar to FIG. 2 showing the use of the fitting illustrated in FIG. 4 with a connector.

When the ball 100 has been moved to the position indicated in FIG. 6 of the drawings the inlet 84 is sealed off. At this point fluid from an auxiliary or second source may be introduced into the housing 82 through appropriate fittings 122 attached to the pipe 110 so that such a fluid flows through openings 124 in the end of this pipe adjacent to the magnet 114. From here such a fluid, of course, flows through the guide sleeve 118 and out through the outlet 90. In order to prevent leaks an O-ring seal 126 or the equivalent may be located within the member 108 around the pipe 110.

Those skilled in the art to which this invention pertains will realize that it is not necessary to use a magnetic ball serving as a valve body within the fitting 80 when this fitting is employed in the same manner as the fitting 10 in a vertical position. In such cases, of course, the permanent magnet 102 may be omitted from this fitting. It will also be realized that in the fitting 10 a perforated guide sleeve such as the guide sleeve 118 is not needed because the opening 22 is smaller than the ball 28 so that there is no danger of this ball passing through the outlet 20.

The fitting 80 is primarily intended to be used in various locations where it is desired to locate this fitting in such a manner that the two valve seats within it are not vertically aligned, although, of course, it may be used in this manner. This fitting 80 is considered desirable where it is to be installed or handled in such a way that there may be some danger of the ball within this fitting being located in other than a desired position.

Because of the nature of this invention and the fact that by-pass fittings as herein described may be modified in accordance with engineering skill this invention is to be considered as being limited solely by the appended claims forming a part of this disclosure.

I claim:

1. In combination: a by-pass fitting which includes: a housing shaped generally as a T fitting, said housing including aligned first and second inlets spaced from one another and an outlet located between said inlets, means defining a valve seat adjacent to each of said inlets within the interior of said housing, and a valve body located within said housing, said valve body being capable of seating against either of said valve seats so as to form a seal therewith; and a connector which includes a member threadably connected to one of said inlets of said housing, said member having a hole formed therein, a pipe movably fitting through said hole with substantially a fluid tight fitting, said pipe having an end adapted to engage said valve body so as to move said valve body from against said valve seat adjacent to said one of said inlets to against said valve seat adjacent to said other of said inlets, and opening means formed in said pipe adjacent to said end of said pipe for conveying gas between the interior of said pipe and the interior of said housing, bleed valve means located on said member so as to lead through said member so as to connect the interior of said housing with the exterior of said member.

2. In combination: a by-pass fitting which includes: a housing shaped generally as a T fitting, said housing including aligned first and second inlets spaced from one another and an outlet located between said inlets, means defining a valve seat adjacent to each of said inlets within the interior of said housing, and a valve body located within said housing, said valve body being capable of seating against either of said valve seats so as to form a seal therewith; and a connector which includes a member threadably connected to one of said inlets of said housing, said member having a hole formed therein, a pipe movably fitting through said hole with substantially a fluid tight fitting, said pipe having an end adapted to engage said valve body so as to move said valve body from against said valve seat adjacent to said one of said inlets to against said valve seat adjacent to said other of said inlets, and opening means formed in said pipe adjacent to said end of said pipe for conveying gas between the interior of said pipe and the interior of said housing, said valve body is formed of a magnetic material and including permanent magnetic means for holding said valve body located on said end of said pipe.

3. A by-pass fitting which includes: a housing shaped generally as a T fitting, said housing including aligned first and second inlets spaced from one another and an outlet located between said inlets; means defining a valve seat adjacent to each of said inlets within the interior of said housing; and a ferromagnetic valve body located within said housing, said valve body being capable of seating against either of said valve seats so as to form a seat therewith; plug means located within one of said inlets so as to form a seal with said housing, said plug means being formed of non-magnetic material; and permanent magnet means held by said plug means, said permanent magnet means being capable of holding said valve body with respect to said plug means.

4. A by-pass fitting which includes: a housing shaped generally as a T fitting, said housing including aligned first and second inlets spaced from one another and an outlet located between said inlets; means defining a valve seat adjacent to each of said inlets within the interior of said housing; and a ferromagnetic valve body located within said housing, said valve body being capable of seating against either of said valve seats so as to form a seat therewith; plug means located within one of said inlets so as to form a seal with said housing; and permanent magnet means associated with said plug means, said permanent magnet means being capable of holding said valve body with respect to said plug means.

References Cited in the file of this patent

UNITED STATES PATENTS

| | | |
|---|---|---|
| 10,082 | Wright | Oct. 4, 1853 |
| 542,795 | Cary | July 16, 1895 |
| 721,763 | Wehner et al. | Mar. 3, 1903 |
| 809,857 | Stenwall | Jan. 9, 1906 |
| 871,717 | Lyter | Nov. 19, 1907 |
| 1,595,186 | Gray | Aug. 10, 1926 |
| 1,871,327 | Kuen | Aug. 9, 1932 |
| 1,890,494 | Borden | Dec. 13, 1932 |
| 2,237,014 | Stoehrer | Apr. 1, 1941 |
| 2,484,628 | Le Valley | Oct. 11, 1949 |
| 2,646,244 | Sohn | July 21, 1953 |
| 2,664,266 | Johnson | Dec. 29, 1953 |

FOREIGN PATENTS

| | | |
|---|---|---|
| 438,467 | Great Britain | Nov. 18, 1935 |
| 459,389 | Italy | Sept. 5, 1950 |